March 9, 1937.
H. A. CURTIS
2,072,981
PRODUCING PHOSPHOROUS
Filed March 18, 1936
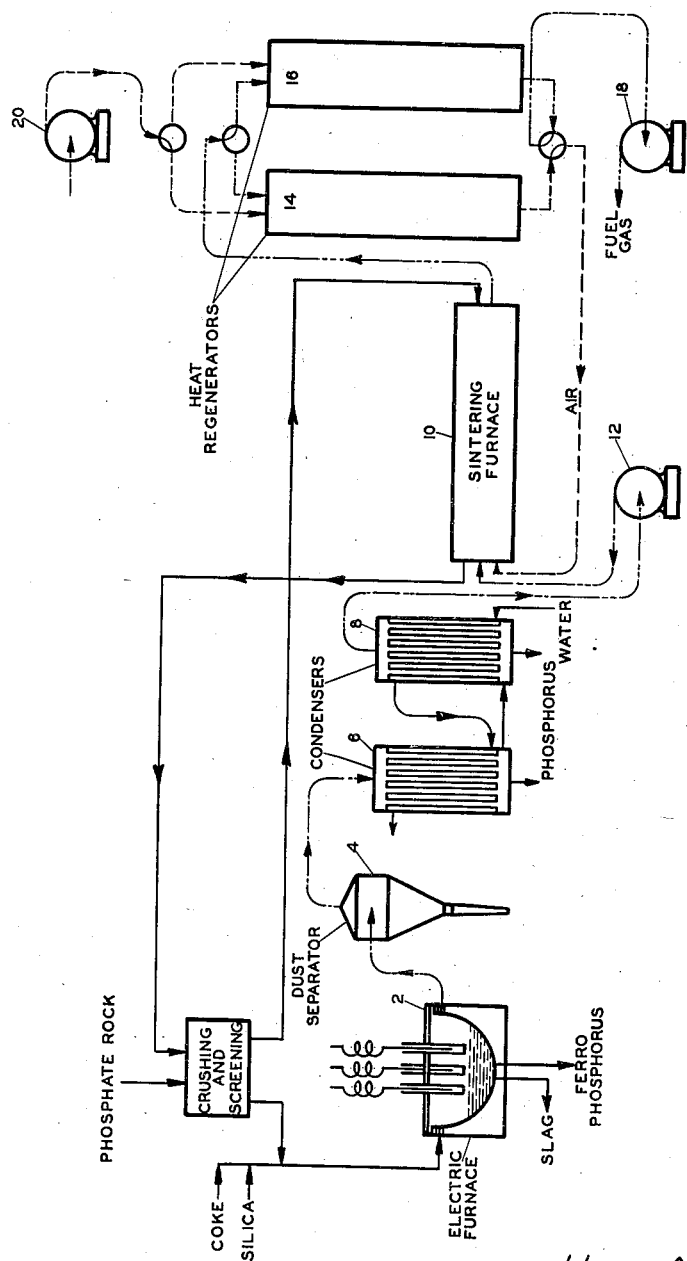
Harry A. Curtis
INVENTOR
BY Arthur L. Davis
ATTORNEY

Patented Mar. 9, 1937

2,072,981

UNITED STATES PATENT OFFICE 2,072,981

PRODUCING PHOSPHORUS

Harry A. Curtis, Knoxville, Tenn., assignor to Tennessee Valley Authority, Wilson Dam, Ala., a corporation Application March 18, 1936, Serial No. 69,485

1 Claim. (Cl. 23—223)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a process for producing elemental phosphorus from phosphate rock.

One of the objects of this invention is to provide a continuous method and an efficient means for producing elemental phosphorus from run-of-the-mine phosphatic materials. Another object of this invention is to provide a process for the removal of those constituents of a phosphate reduction furnace gas which are reactive with refractories and other materials with which it may come in contact, so that the gas may be of suitable quality for use in industrial heating operations. Another object of this invention is to provide a process for separating the uncondensed and unseparated elemental phosphorus from the cooled phosphate reduction furnace gas. Other objects of this invention include the conservation of a major portion of the calorific value of a phosphate reduction furnace gas.

I have discovered a process for the continuous production of elemental phosphorus from run-of-the-mine phosphatic material by reducing a charge of the coarse portion material with carbon and silica to form a phosphate reduction furnace gas containing elemental phosphorus, by indirectly condensing and separating the major portion of elemental phosphorus from the gas, by sintering the fine portion of the phosphatic material by use of heat derived from the combustion of all of the uncondensed and unseparated elemental phosphorus and a portion of the carbon monoxide in the cooled gas, with the sintered rock being crushed and screened and the coarse and fine portions, respectively, being combined with the corresponding portions of crude phosphatic material.

The accompanying drawing, which forms a part of this specification, is a diagrammatic, vertical, sectional view of one form of apparatus for the embodiment of my invention.

Phosphate rock, as received from the mining operations, is screened or crushed and screened to produce coarse phosphate rock and fine phosphate rock. A phosphate reduction furnace charge of the coarse phosphate rock, silica and coke is heated to the proper reaction temperature in the electric furnace 2. Slag and ferro-phosphorus, respectively, are tapped continuously from the hearth of furnace 2, and the phosphate reduction furnace gas, comprised of elemental phosphorus and carbon monoxide, which is evolved continuously, is withdrawn from the top of furnace 2, and passes through one or a plurality of dust separators, represented by dust separator 4, maintained at a temperature not lower than the dew point of the phosphorus in the gas, to remove the major portion of the fine, solid charge which is entrained in the phosphate reduction furnace gas. The phosphate reduction furnace gas from dust separator 4, passes through one or a plurality of indirectly cooled condensers, represented by condenser 6, where the gas is cooled to the temperature not lower than the melting point of elemental phosphorus. A substantial proportion of the elemental phosphorus in the gas is condensed and that portion which separates from the gas is withdrawn from the bottom of the condenser 6, and the cooled gas from which this elemental phosphorus has been separated is passed through one or a plurality of indirectly cooled condensers represented by condenser 8, in which some additional elemental phosphorus is condensed and most of the liquid phosphorus carried in suspension in the gas separated. The gas leaving condenser 8, is largely carbon monoxide, but due to the fairly high vapor of phosphorus, still contains some elemental phosphorus vapor, as well as some suspended liquid elemental phosphorus which has not separated from the gas. The fine phosphate rock, which is separated from the coarse phosphate rock, is charged into a sintering furnace 10, and is heated to the temperature of sintering by admitting the gas supplied from condenser 8, by blower 12, which serves to maintain a substantially atmospheric pressure at the top of electric furnace 2, and only a sufficient amount of preheated air to oxidize all of the elemental phosphorus and a small, but nevertheless sufficient, portion of the carbon monoxide in the gas to supply the heat required for the sintering. The sintered rock is withdrawn from sintering furnace 10, is cooled and is crushed and screened into coarse and fine portions, along with the unsintered rock from the field. The coarse sintered phosphate rock and the fine sintered phosphate rock proceed through the process along with the coarse and fine unsintered phosphate rock, respectively. A gaseous mixture, which is fuel gas, comprised of carbon monoxide, carbon dioxide and nitrogen, from the sintering furnace 10, is passed alternately through a plurality of heat regenerators, represented by heat regenerators 14 and 16, respectively, to blower 18, which serves to maintain a substantially atmospheric pressure in sintering furnace 10. Blower 20, supplies the air required to be preheated for use in sintering furnace 10. The fuel gas from blower 18, is withdrawn for use as such outside the system.

It is evident that there are numerous factors which will influence conditions for the most satisfactory operation of my invention, the actual limits of which cannot be established except by a detailed study of each set of raw materials and the intermediate and finished products involved.

The phosphate reduction furnace gas used may be produced in any suitable unit for the reduction of a phosphatic charge. The phosphate reduction furnace gas from a blast furnace contains 0.7 to 1.0% elemental phosphorus and 35 to 40% carbon monoxide, while the phosphate reduction furnace gas from an electric furnace contains 8.5 to 9.5% elemental phosphorus and 75 to 80% carbon monoxide.

The phosphate reduction furnace gas from a blast furnace may be passed through a dust separator at a temperature above the dew point of the elemental phosphorus contained in the gas, which is approximately 120° C. (248° F.) and a substantial proportion of this elemental phosphorus, approximately 70%, may be separated from the gas after cooling to the usual temperatures available when cooling water of a temperature in the order of 15 to 25° C. is used. An additional amount of elemental phosphorus, which is condensed and which may be separated from the gas only with considerable difficulty, may be separated by electrical precipitation. The phosphate reduction furnace gas from an electric furnace may be passed through a dust separator at a temperature above the dew point of the elemental phosphorus contained in the gas, which is approximately 185° C. (365° F.), and a substantial proportion of this elemental phosphorus, approximately 95%, may be separated from the gas after cooling to the usual temperatures available when cooling water of a temperature in the order of 15 to 25° C. is used. An additional amount of elemental phosphorus, which is condensed and which may be separated from the gas only with considerable difficulty, may be separated by electrical precipitation. In either event some elemental phosphorus remains in the cooled gas and this must be separated before the gas may be used for fuel purposes.

A fuel gas containing as low as 17.5% carbon monoxide with a calorific value of 60 B. t. u. per cubic foot has been found to be satisfactory for numerous industrial uses. I have found that, by oxidizing all of the elemental phosphorus and only a sufficient quantity of the carbon monoxide in the gas to supply the heat required for the fusion of the phosphate formed by the reaction between the phosphate rock and the phosphorus pentoxide, a fuel gas is obtained which contains more than the 17.5% carbon monoxide with a calorific value greater than 60 B. t. u. per cubic foot, sufficiently freed from the objectionable quantities of phosphorus and its compounds so that it may be used for numerous industrial purposes including the firing of refractory lined furnaces and regenerators in which it could not otherwise be used satisfactorily.

The amount of rock treated by a volume of gas containing a unit quantity of elemental phosphorus depends upon the proportion of the carbon monoxide of the phosphate reduction furnace gas oxidized, from which a substantial portion of the elemental phosphorus has been condensed and separated. However, it is ordinarily most desirable in carrying out this invention to oxidize the small portion of elemental phosphorus remaining in the gas and only that portion of the carbon monoxide which is required to sinter the amount of the fine phosphate rock which is required to be treated. In the course of sintering, some of the fine phosphate rock will, of course, react with the phosphorus pentoxide formed to form calcium metaphosphate but the amount of rock so reacting will only be a small portion of the total rock so processed.

The partial oxidation of the phosphate reduction furnace gas, from which a substantial proportion of the elemental phosphorus has been condensed and separated, may be carried out by the use of air which has not been preheated but it is preferable to preheat the air so used to a temperature of at least 872° C. (1600° F.). This preheating may be accomplished by the combustion of a portion of the fuel gas in a suitable heat regenerating apparatus.

The hot, sintered, fine phosphate rock, cooled in the course of its removal from the sintering furnace, is then crushed and screened, the coarse and fine portions being combined respectively with the corresponding portions of the run-of-the-mine phosphate rock. This crushing and screening of the sintered fine phosphate rock may be carried out separately or in conjunction with the crushing and screening of the run-of-the-mine phosphate rock. The term "run-of-the-mine phosphate rock" is used in the description and claim to mean a mixture of various sizes of phosphate rock through the range of fine sands to large lump from which only the clay and silica which ordinarily accompanies the phosphate in the mineral deposit has been removed.

The hot fuel gas from the sintering furnace is preferably used to preheat the air required for the sintering furnace by a heat exchange relationship. Under those circumstances in which it is not desirable to use preheated air in the sintering furnace, the hot fuel gas may be cooled by any suitable means and delivered directly to the fuel gas line.

It will be seen, therefore, that this invention may actually be carried out by the modification of certain details without departing from its spirit or scope.

I claim:

Process of producing phosphorus from run-of-the-mine phosphate rock, which comprises, crushing and screening run-of-the-mine phosphate rock and the sintered fine phosphate rock subsequently produced to form one portion of coarse phosphate rock and another portion of fine phosphate rock; reducing a charge of the coarse phosphate rock, silica and carbon in an electric furnace heated to reaction temperature by the passage of an electrical current through the charge; separating the fine, solid portion of the charge entrained in the gas in a dust separator maintained at the temperature above the dew point of the elemental phosphorus in the phosphate reduction furnace gas; cooling the phosphate reduction furnace gas indirectly; separating the condensed phosphorus from the cooled phosphate reduction furnace gas; sintering the portion of fine phosphate rock in a sintering furnace heated with the products of combustion of the phosphate reduction furnace gas from which a substantial portion of the elemental phosphorus has been condensed and separated and a limited quantity of preheated air, the quantity of air being limited to the amount of its oxygen content required for the oxidation of the elemental phosphorus and the oxidation of only a portion of the carbon monoxide in the gas sufficient to supply the heat required for the sintering of the fine phosphate rock; withdrawing the sintered fine phosphate rock from the sintering furnace; mixing the sintered fine phosphate rock with the run-of-the-mine phosphate rock for the crushing and screening referred to in the first step of the process; withdrawing the hot partially oxidized gaseous mixture of fuel gas comprising carbon monoxide, carbon dioxide and nitrogen, from the sintering furnace; and preheating the air required for the operation of the sintering furnace by a heat exchange relationship with the hot gaseous mixture of fuel gas withdrawn from the sintering furnace.

HARRY A. CURTIS.